W. A. JONES.
COMBINED CHURN AND ICE CREAM FREEZER.
APPLICATION FILED FEB. 4, 1909.
939,512.
Patented Nov. 9, 1909.
2 SHEETS—SHEET 1.
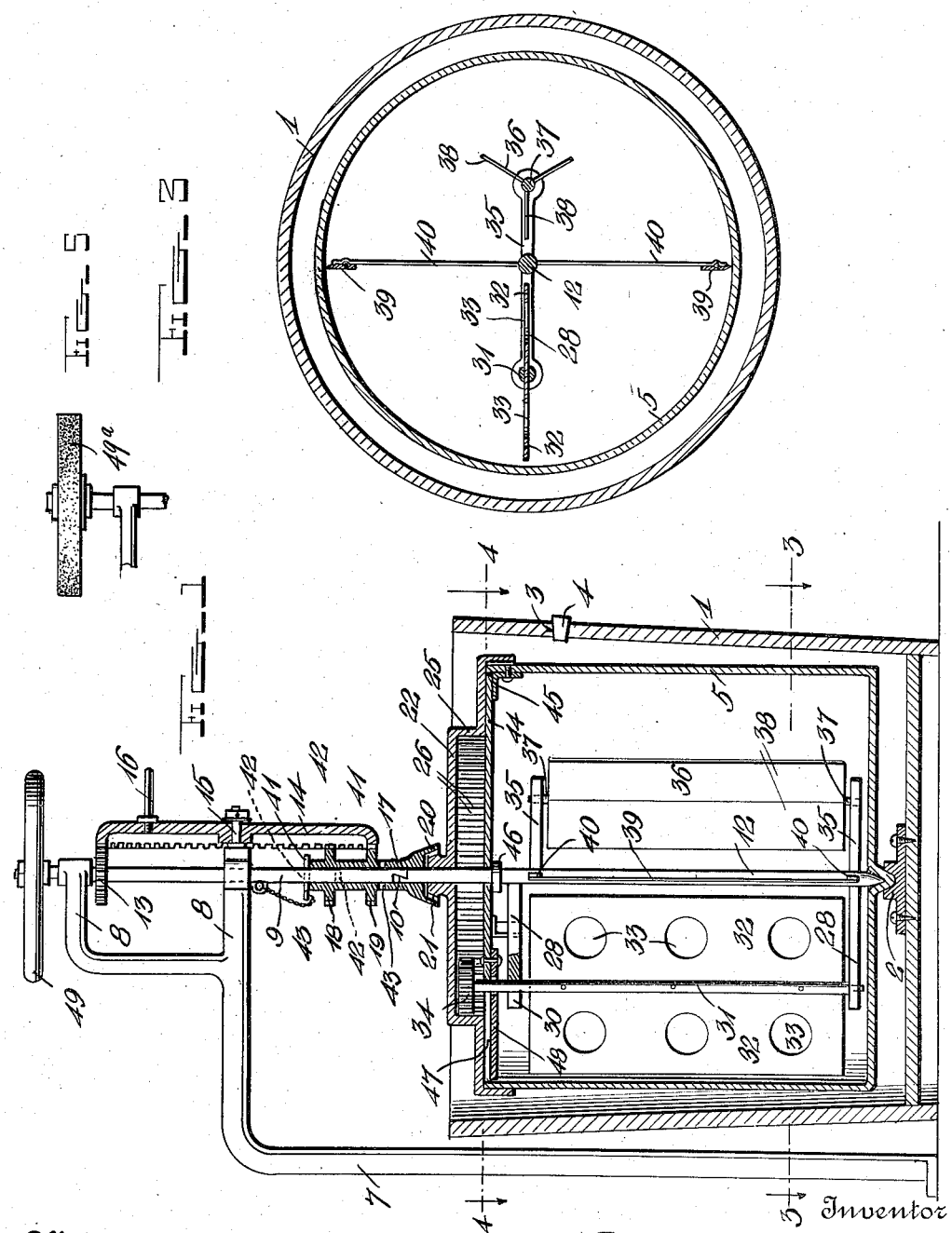
Witnesses
C. F. Griesbauer
Inventor
William A. Jones
By H. B. Willson & Co.
Attorneys

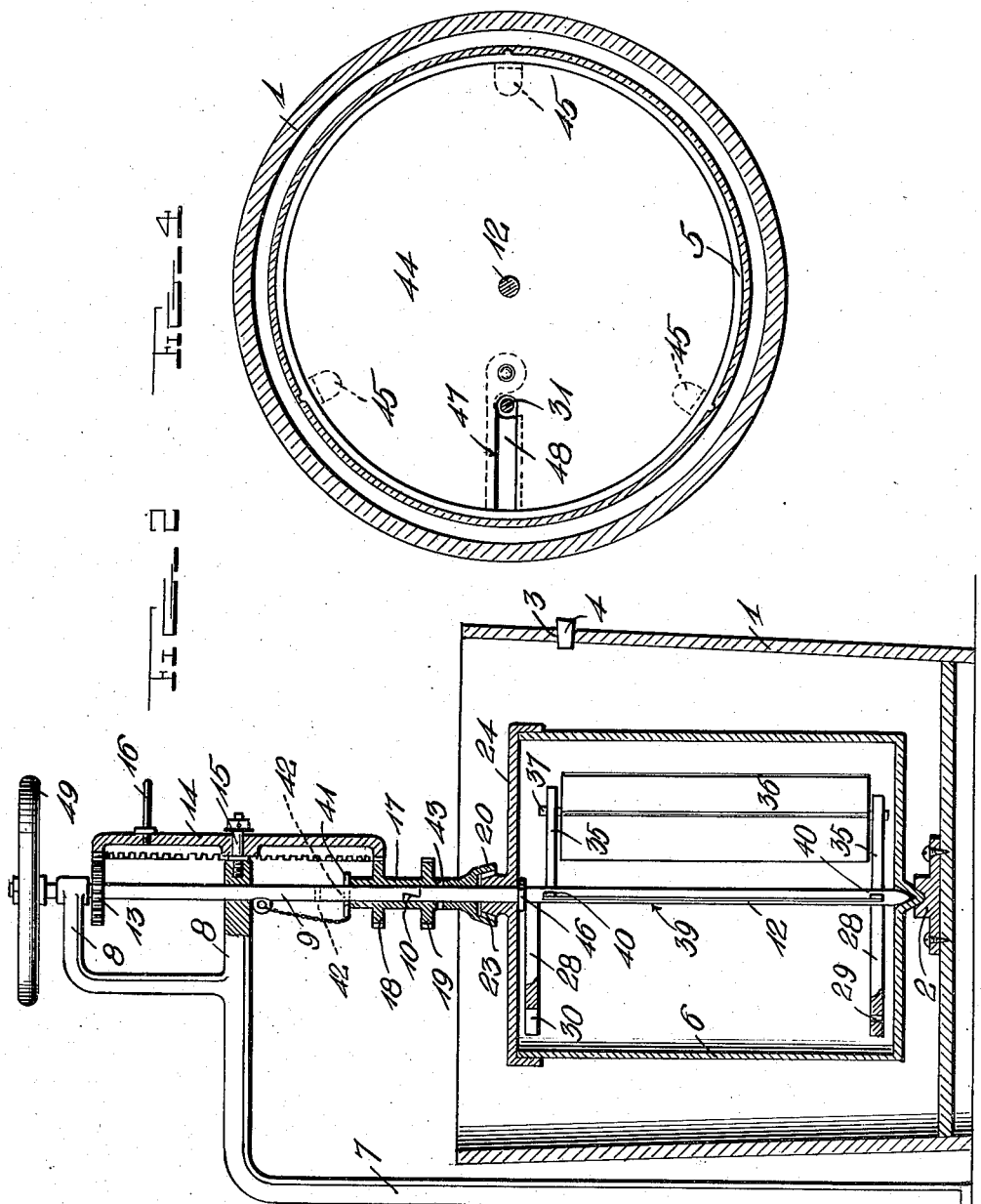

UNITED STATES PATENT OFFICE.

WILLIAM A. JONES, OF DENTON, TEXAS.

COMBINED CHURN AND ICE-CREAM FREEZER.

939,512.  Specification of Letters Patent.  Patented Nov. 9, 1909.

Application filed February 4, 1909. Serial No. 476,028.

*To all whom it may concern:*

Be it known that I, WILLIAM A. JONES, a citizen of the United States, residing at Denton, in the county of Denton and State of Texas, have invented certain new and useful Improvements in Combined Churns and Ice-Cream Freezers; and I do declare the following to be a full, clear, and exact description of the invention, such as will enable others skilled in the art to which it appertains to make and use the same.

This invention relates to a combined churn and ice cream freezer.

The object of the invention is to provide a combined churn and freezer which will be simple, strong and durable in construction, efficient in operation, and which may be readily transformed from a churn into a freezer, or from a freezer into a churn.

With this and other objects in view, the invention consists of certain novel features of construction, combination and arrangement of parts as will be described and particularly pointed out in the appended claims.

In the accompanying drawing, Figure 1 is a vertical sectional view of the device arranged in the form of a churn; Fig. 2 is a similar view showing the device arranged in the form of an ice cream freezer; Fig. 3 is a horizontal sectional view on the line 3—3 of Fig. 1; and Fig. 4 is a detail plan view of the false lid or inside cover plate of the churn. Fig. 5 is a detail view showing the fly wheel of the machine in the form of a grindstone.

Referring more particularly to the drawings, 1 denotes a tub open at its upper end and constructed similar to the usual form of ice tub of ice cream freezers. In the center of the bottom of the tub is arranged the usual step bearing, 2, to receive and pivotally support the churn or freezer. The tub is provided in one side with the usual overflow opening, 3, which, if desired, may be closed by a plug, 4. When the device is employed as a churn, a churn body or receptacle, 5, is arranged in the tub, 1, and when the device is employed as an ice cream freezer, the receptacle, 5, is removed, and in its place is arranged a freezer can, 6.

The operating mechanism for the churn and freezer is mounted in a suitable supporting frame, 7, said frame being suitably secured at its lower end and projects upwardly above the tub a sufficient distance to accommodate the operating mechanism. On the upper portion of the frame are formed vertically spaced laterally projecting bearing arms, 8, in which is revolubly mounted the upper portion of an operating shaft, 9, said shaft being notched at its lower end to form an interlocking joint, 10, with the upper end of the lower shaft section, 12, which projects downwardly into the churn body or freezer can in the tub, 1. On the upper portion, 9, of the shaft is fixedly mounted a gear, 13, which is adapted to mesh with the teeth of an operating gear wheel, 14, which is revolubly mounted on a stub shaft, 15, arranged on the lower bearing arm, 8, of the frame. The wheel 14 may be operated by any suitable power, but is here shown as provided with a crank handle, 16, whereby the same is manually operated.

Slidably and loosely mounted on the upper and lower sections, 9 and 12, of the operating shaft is a sleeve or ferrule, 17, which serves to securely hold the jointed sections of the operating shaft in firm engagement with each other. On the upper end of the sleeve, 17, is arranged an upper gear, 18, while intermediate of the ends of the sleeve is arranged a lower gear, 19. The ferrule or sleeve, 17, is adapted to be raised and lowered on the operating shaft to bring one or the other of the gears, 18, or 19, into engagement with the operating gear wheel, 14, whereby said sleeve is revolved in a direction opposite to the movement of the shaft which is driven through the gear, 13, fixed thereon and which engages the upper portion of the operating gear wheel, as shown.

On the lower end of the sleeve, 17, is formed a crown gear, 20, which is adapted to be engaged with an annular series of crown gear teeth, 21, formed on the upper side of the churn cover, 22, when the churn is used, or with an annular series of crown gear teeth, 23, formed on the cover, 24, of the freezer can whereby said churn or freezer can is revolved in an opposite direction to the movement of the operating shaft. The churn cover, 22, is provided with an annular upwardly-projecting portion, 25, in which is arranged an annular series of gear teeth, 26, the purpose of which will hereinafter appear. The churn cover 22 and the freezer can cover 24 are adapted to be secured to the upper ends of the churn and freezer can in any suitable manner to turn said churn or can when the covers are operated by the sleeve, 17.

On the lower section of the operating shaft are arranged the dasher and agitating devices which are employed in connection with the churn and freezer. On one side of the lower section of the shaft are arranged upper and lower right-angularly-projecting dasher supporting arms, 28, in the lower one of which is formed a bearing opening, 29, while in the upper arm is formed a notch or recess, 30. With the bearing aperture, 29, and notch, 30, is removably engaged the upper and lower portion of a dasher shaft, 31, on which are arranged the dasher blades or paddles, 32, which are here shown as provided with a series of apertures, 33, by means of which the cream is thoroughly agitated and churned. On the upper end of the dasher rod or shaft, 31, is fixedly mounted a spur gear pinion, 34, which is adapted to engage the gear teeth, 26, arranged on the inner side of the projection, 25, of the churn cover, whereby, when the cover and churn are rotated by the sleeve, 17, the movement thereof will be imparted through the gear, 34, to the churn dasher to revolve the same independently of the movement of the churn body.

On the opposite side of the lower section of the operating shaft, 12, are arranged upper and lower supporting arms, 35, in which is revolubly mounted an ice cream dasher 36, said dasher comprising a vertically disposed shaft, 37, on which is arranged a series of radially-disposed blades, 38. In addition to the dasher, 36, the lower section of the operating shaft has arranged thereon scraping blades, 39, which are supported on the outer ends of radially-projecting arms, 40, which are secured at their inner ends to the shaft, 12. The arms, 40, are of such length that the scraping blades, 39, will be held in close engagement with the inner wall of the freezer can so that the ice cream will be prevented from freezing onto the sides of the can. When the device is used in connection with an ice cream freezer, the churn dasher is removed, this being readily accomplished by reason of the loose connection of the dasher shaft, 31, with the supporting arms, 28.

When the device is used as a churn, the sleeve or ferrule, 17, is elevated on the operating shaft so that the lowermost gear 19 is in engagement with the operating gear wheel, 14, the raising of the sleeve, 17, being necessary to provide for the difference in height between the churn body and the freezer can. When the device is used as a freezer, the ferrule is slipped down onto the operating shaft until the upper gear, 18, is in engagement with the operating gear wheel. The gears, 18 and 19, are spaced apart and at such distance from the crown gear on the lower end of the sleeve or ferrule as to provide for the engagement of the crown gear with the teeth on the covers of the churn and freezer can.

In order to hold the sleeve in position for engaging the gears, 18 and 19, with the operating gear, and the crown gear, 20, with the teeth on the covers of the churn or freezer can, I provide a stop pin, 41, which is adapted to be inserted through one of a series of apertures, 42, formed in the operating shaft. I also provide a transversely disposed passage, 43, through the sleeve or ferrule, 17, which is adapted to aline with one of the passages 42 through the shaft and to receive the stop pin 41 thereby holding the sleeve up on the shaft and out of engagement with the tops of the churn or freezer can and above the interlocking connection between the sections of the shaft, thereby permitting the tub and the churn or freezer therein to be moved out from under the operating mechanism so that the contents of the churn or freezer may be readily removed. The stop pin 41 is preferably secured to the upper section 9 of the operating shaft by a chain or flexible connection whereby said pin is prevented from being mislaid or lost.

In connection with the churn, I preferably employ a false lid or inner cover plate 44 which is supported upon suitable lugs 45 on the inner sides of the churn body and on an annular collar 46 on the lower section of the operating shaft. In one side of the cover plate 44 is formed an inwardly projecting notch 47 to permit the insertion of a churn dasher shaft. The notch 47 is adapted to be covered by a fitted cover plate 48. The inner cover or lid 44 is provided to prevent any milk or cream from splashing into the upper portion of the cover where the dasher operating gears are arranged. On the upper end of the operating shaft is arranged a fly wheel 49. If desired this wheel may be in the form of a grindstone 49ª as shown in Fig. 5 of the drawings, for the purpose of sharpening or grinding knives or household articles.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim as new and desire to secure by Letters-Patent, is:

1. In a device of the class described, the combination of a supporting frame, a tub arranged below and spaced from said frame and adapted to receive a revoluble receptacle, a shaft mounted to revolve in said frame, and having a pinion fixed to its upper end, a dasher mounted to revolve with said shaft, an operating gear mounted to rotate on said frame and to mesh with said pinion, a sleeve slidably and rotatably mounted on said shaft, receptacle engaging means carried by said sleeve, and vertically spaced gears fixed on said sleeve to mesh respectively with said operating gear to adapt said sleeve for connection with receptacles of varying heights.

2. In a device of the class described, the combination of a supporting frame, a tub arranged below said frame and adapted to receive a revoluble receptacle, a cover adapted to be engaged with said receptacle to turn the same, a clutch member on said cover, a dasher shaft rotatably mounted in said frame, and formed in separable sections, an adjustable sleeve arranged on said sections to hold them together, a clutch member on the lower end of said sleeve to operatively engage a clutch member on the receptacle cover, an operating gear wheel mounted on said frame, upper and lower gears arranged on said sleeve to turn therewith and adapted to respectively engage said operating gear to provide for the connection of the sleeve with receptacles of varying heights, and a pinion fixed to said shaft and adapted to mesh with said operating gear for turning the shaft in a direction opposite to the receptacle.

3. In a device of the class described, a supporting frame having a laterally extending arm, a tub arranged below and spaced from said arm, a receptacle arranged in said tub, an operating cover arranged on said receptacle, a clutch member on said cover, a dasher shaft revolubly mounted in said frame arm, a revoluble dasher in said receptacle, a sleeve slidably and rotatably mounted on said shaft, means to hold said sleeve in adjusted position on said shaft, a clutch member on the lower end of said sleeve to engage the clutch member on said cover, an operating gear wheel mounted on said frame arm, upper and lower gears on said sleeve adapted to mesh respectively with said operating gear to provide for the connection of the sleeve to receptacles of varying heights, and a pinion fixed on said shaft and adapted to mesh with said operating gear to drive said shaft in a direction opposite to said sleeve.

4. In a device of the class described, a supporting frame having a laterally extending arm, a tub arranged below and spaced from said arm, a receptacle revolubly mounted in said tub, a cover for connection with said receptacle, an upwardly projecting annular flange arranged on said cover and provided on its inner face with a series of gear teeth, a clutch member arranged on said cover, a false lid arranged on said receptacle below said cover, a dasher shaft composed of separable sections and mounted in said frame arm, a clutch member adjustably mounted on said shaft to engage the clutch member on said cover, means for operating said shaft and sleeve, means for operating said shaft and adjustable clutch member in opposite directions, a plurality of dashers arranged on said shaft within said receptacle, one of said dashers being removable, an operating gear on said removable dasher and adapted to operatively engage the teeth on the annular flange of said cover to provide for the operation of said dasher independently of the other dashers.

In testimony whereof I have hereunto set my hand in presence of two subscribing witnesses.

WILLIAM A. JONES.

Witnesses:
J. C. HAWK,
A. H. HARROP.